Figure 1:
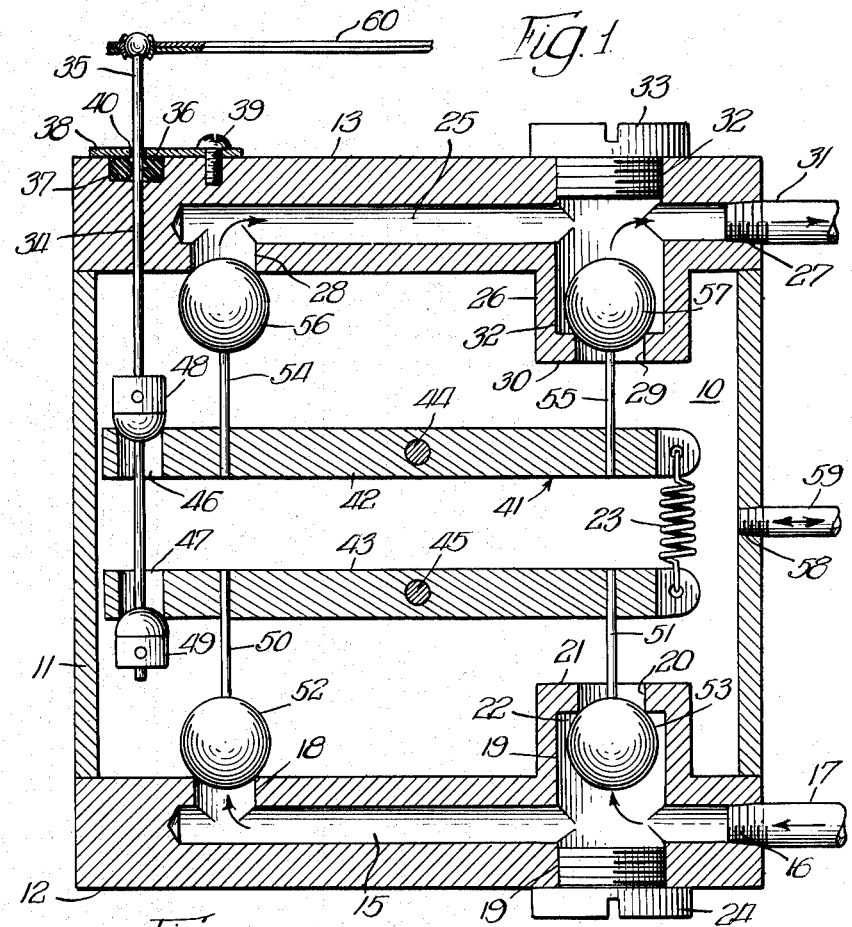

Nov. 23, 1965  D. H. THORBURN  3,219,058
THREE-WAY BALANCED VALVE
Filed Dec. 10, 1963

INVENTOR.
David H. Thorburn,
BY
Byron, Hume, Groen + Clement.
Attys.

United States Patent Office 3,219,058
Patented Nov. 23, 1965

3,219,058
THREE-WAY BALANCED VALVE
David H. Thorburn, Oak Park, Ill., assignor to The Powers Regulator Company, Skokie, Ill., a corporation of Illinois
Filed Dec. 10, 1963, Ser. No. 329,567
8 Claims. (Cl. 137—596.2)

This invention relates to valves and more particularly to three-way valves for use in pneumatic control systems.

It is a primary object of the present invention to provide a three-way balanced valve for use in pneumatic systems to produce a modulated pressure signal in response to a mechanical input signal.

It is another object of the present invention to provide a three-way valve in which mutual cancellation of pressure-differential resistance forces is effected.

It is an additional object of the present invention to provide a three-way balanced valve utilizing a minimum number of parts, to reduce the expense of manufacture, assembly, and repair, yet capable of performing with relative precision.

In accordance with the present invention, there are provided a housing defining a control pressure chamber, supply valving means associated with the chamber, exhaust valving means associated with the chamber, and a control pressure outlet port communicating with the chamber. The supply valving means may consist of a pair of valving supply ports communicating with the chamber and a pair of supply valve members cooperative with the pair of supply ports. The exhaust valving means may similarly consist of a pair of valving exhaust ports communicating with the chamber and a pair of exhaust valve members cooperative with the exhaust ports. Also provided are operating means mounted in the housing for movement in response to application of an external motive force produced by a bi-metallic strip or the like. Lever means are provided which are pivotally mounted in the chamber and connected to the supply valving means and the exhaust valving means. The lever means are adapted to effect mutual cancellation of pressure-differential forces exerted on the supply valving means and the exhaust valving means. In addition, the lever means are responsive to movement of the operating means in a first direction to cause only the supply valving means to open to allow the pressure in the chamber to approach supply pressure and responsive to movement of the operating rod in a second direction to cause only the exhaust valving means to open to allow the pressure in the chamber to approach exhaust pressure. The lever means are also biased to maintain the supply valving means and the exhaust valving means normally closed in the absence of an external motive force applied to the operating means. Thus, a three-way balanced valve is provided in which a pressure signal modulated in response to a mechanical input is caused to appear at the control pressure outlet port.

Other objects and features of the invention will be made apparent by reference to the following description in conjunction with the drawings.

Figure 2:
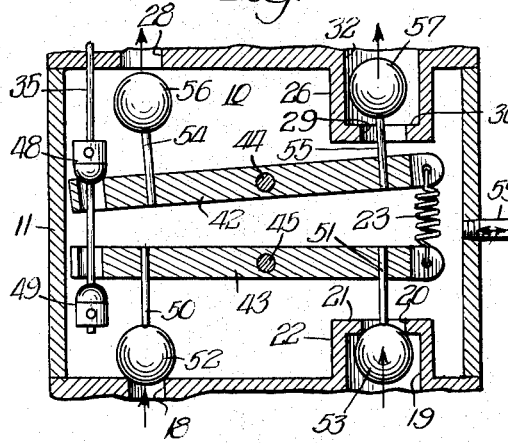
Figure 3:
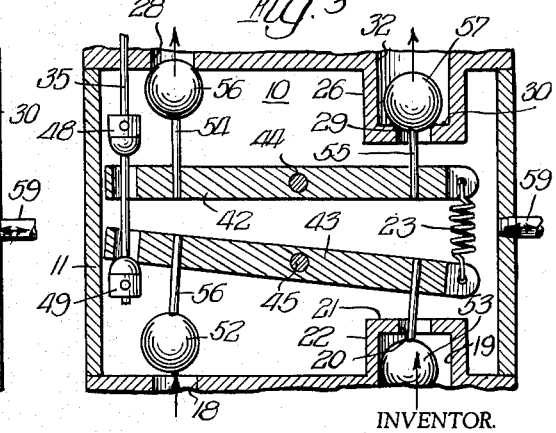

In the drawings:

FIGURE 1 is a side elevational view in cross-section of a preferred embodiment of the invention; and FIGURES 2 and 3 illustrate the movement of the lever arrangement of the FIGURE 1 embodiment.

Referring to FIGURE 1, the balanced valve includes a pressure chamber 10 enclosed by a casing 11, a base plate 12 and a top plate 13. The casing 11 is secured to the plates 12 and 13 as by welding. It may be found desirable to provide casing 11 with a removable portion (not shown) affixed to the remainder of casing by screws or the like to enable ease of access to the chamber 10 for repair purposes.

The base plate 12 is provided with an inwardly extending bore 15 threaded at its opening to define an inlet 16 which is provided to receive a complementary-threaded nipple or pipe end 17 from a supply pressure source. A first supply port 18 provides communication from bore 15 to chamber 10. A cylindrical member 22 is affixed to the plate 12 in alignment with a bore 19 which extends entirely through the plate 12. The cylindrical member 22 protrudes into the chamber 10 and is provided with an inwardly extending annular flange 21 which defines a second supply port 20. The portion of bore 19 adjacent the exterior side of the plate 12 is threaded to receive a complementary-threaded plug screw 24 which may conveniently be removed when access to the interior of cylindrical member 22 is desired.

The top plate 13 is structurally similar to the base plate 12. The plate 12 is provided with an inwardly extending bore 25 having a threaded portion defining an outlet 27 to which an exhaust pipe or nipple 31 may be connected. A first supply port 28 provides communication from the chamber 10 to the bore 25. A cylindrical member 26 is affixed to the plate 13 in alignment with a bore 32 which extends entirely through the plate 13. The cylindrical member 26 protrudes into the chamber 10 and is provided with an inwardly extending annular flange 30 which defines a second exhaust port 29. The portion of the bore 32 adjacent the exterior side of the plate 13 is threaded to receive plug screw 33 which may be removed when access to the interior of the cylindrical member 26 is desired. A bore 34 extending through the plate 13 to the interior of the control pressure chamber 10 is adapted to slidably receive an operating rod 35. An O-ring sealing member 36 is disposed in a cylindrical recess 37 which is coaxial with bore 34. The O-ring 36 is secured in the recess 37 by a cover plate 38 affixed to the top of the plate assembly 12 by the screw 39. The cover plate 38 is provided with an opening 40 to permit the passage of the operating rod 35 therethrough.

Disposed in control pressure chamber 10 is a lever assembly 41 which comprises two levers 42 and 43 interconnected at one end by a bias spring 23. The levers 42 and 43 are mounted on pivot rods 44 and 45, respectively. At their ends opposite the bias spring 23, the levers 42 and 43 are provided with aligned openings 46 and 47, respectively. The operating rod 35 extends longitudinally through the openings 46 and 47 which are of substantially larger diameter than the operating rod 35. Two round-ended lugs 48 and 49 are mounted on the operating rod 35 adjacent the levers 46 and 47, respectively, and are arranged so as to abut against the openings 46 and 47, respectively, in opposed alignment. Mounted on the lever 43 on opposite sides of the pivot 45 are two valve stems 50 and 51 which extend toward the plate 12 in coaxial alignment with the supply ports 18 and 20, respectively. Two spherical valve members 52 and 53 are affixed to the ends of the valve stems 50 and 51, respectively.

The valve member 52 is disposed within the chamber 10 and is adapted to be seated in the supply port 18. The valve member 53 is disposed within cylindrical member 22 and is adapted to be seated in the supply port 20. The lengths of the valve stems 50 and 51 are such that the valve members 52 and 53 are fully seated in supply ports 18 and 20, respectively, when the lever 43 is substantially parallel with the plate 12.

The lever 42 is similarly provided with two valve stems 54 and 55 which extend toward the plate 13 and which are affixed to the lever 42 on opposite sides of the pivot 44 in coaxial alignment with the exhaust ports 28 and 29, respectively. The spherical valve member 56, affixed to the end of the valve stem 54, is disposed within the chamber 10 and is adapted to be seated in the exhaust port 28. The spherical valve member 57, affixed to the end of the valve stem 55, is disposed within the cylindrical member 26 and is adapted to be seated in the exhaust port 29. The lengths of the valve stems 54 and 55 are such that the valve members 56 and 57 are fully seated in the exhaust ports 28 and 29, respectively, when the lever 44 is substantially parallel to the plate 13.

Finally provided is a threaded bore 58 extending through the casing 11. The threaded bore 58 forms a control pressure outlet port 58 to which a complementary threaded pipe end or nipple 59 may be coupled to connect the control pressure chamber 10 to a control mechanism responsive to pressure level modulations.

The ports 18, 20, 28 and 29 are preferably bored with mutually equivalent internal diameters, and the spherical valve members 52, 53, 56 and 57 are also preferably provided with mutually equivalent diameters—sufficiently larger than the diameter of the ports 18, 20, 28 and 29 to insure effective valving action. With these conditions, the forces exerted on the valve members 52 and 53, respectively, due to a difference between the supply source pressure and the chamber 10 pressure when these valve members are seated in the supply ports 18 and 20, respectively, will be equal in value and direction. Similarly, the forces exerted on the valve members 56 and 57, respectively, due to a difference between the chamber 10 pressure and the exhaust atmosphere pressure when these valve members are seated in the exhaust ports 28 and 29, respectively, will be equal in value and direction. With the valve stems 54 and 55 equally spaced from pivot 44, the recited pressure-differential forces exerted on the respective valve members 56 and 57 developed mutually cancelling moments about pivot 44. Similarly, with the valve stems 50 and 51 equally spaced from the pivot 45, the recited pressure-differential forces exerted on the respective valve members 52 and 53 develop mutually cancelling moments about pivot 45. The valve is thereby balanced to effectively eliminate undesirable "dead-spot" resistance to unseating of the valve members.

It will be apparent that, in the absence of a motive force exerted upon the operating rod 35, the levers 42 and 43 are urged by bias spring 23 into a mutually parallel posture such that supply ports 18 and 20 and exhaust ports 28 and 29 are maintained normally closed. Due to the arrangement of seating engagements of the valve members 52, 53, 56 and 57, the lever 43 can pivot from this position in a clockwise direction only and the lever 42 can pivot from this position in a counter-clockwise direction only.

In operation in a pneumatic system, the valve is connected at its supply port 16 to the source of fluid medium maintained at a desired supply pressure. At the exhaust outlet 27, the valve is connected to an exhaust pipe and, at the control pressure port 58, the valve is connected to a pressure responsive control mechanism. The operating rod 35 is engaged, and actuated, by any suitable sensing element, such as a bi-metallic strip, bellows, or the like. By way of example, operating rod 35 is depicted in FIGURE 1 engaged by a ball-and-socket joint to the flexing end of a bi-metallic strip 60. So arranged, the balanced valve is adapted to present to the pressure sensitive control mechanism a pressure signal modulated between limits of the pressure gradient between the supply and exhaust pressure levels in response to external motive forces applied to the operating rod 35.

When the operating rod 35 is moved downwardly by the action of a sensing element, the downward force is communicated to the lever 42 via the lug 48, as shown in FIGURE 2. This action causes the lever 42 to rotate counter-clockwise about its pivot mounting 44. Thus, the valve members 56 and 57 are moved from their normal seated position in the exhaust ports 28 and 29, respectively, to allow the escape of fluid medium contained in the control pressure chamber 19 through the exhaust ports 28 and 29. However, the downward movement of the operating rod 35 transmits no force to the lever 43 through the lug 49 since the lug 49 is moved away from the lever 43 by downward movement of the operating rod 35. Accordingly, the supply ports 18 and 20 remain normally closed due to the bias of the spring 23, and the control pressure in the chamber 10 is reduced toward the pressure level of the exhaust atmosphere. The resulting control pressure decrease is transmitted to control mechanism via the pipe end 59 connected to the control pressure port 58. Upon release of the downward force on the operating rod 35, the lever 42 is returned to equilibrium position by the action of the bias spring 23.

As shown in FIGURE 3, upward movement of the operating rod 35 similarly produces a clockwise rotation of the lever 43 about its pivot rod 45, thereby unseating the valve members 52 and 53 and allowing the influx of fluid medium at supply source pressure through the supply ports 18 and 20. Since upward movement of the operating rod 35 does not transmit force to the lever 42 through the lug 48, the exhaust ports 28 and 29 remain closed due to the bias of the spring 23. Thus, the control pressure in the chamber 10 is increased toward the pressure level of the supply source connected to the inlet 16 by the pipe end 17. The resulting control pressure increase is communicated to the control mechanism via the port 58 and the pipe end 59.

Although a specific form of the invention has been disclosed in this specification, it is to be understood that this is merely by way of example and not to be construed as a limitation. It will be apparent that certain modifications will be made within the scope of the claims without departing from the spirit of the invention.

It is claimed:
1. A control valve comprising:
  (a) a housing defining a pressure chamber;
  (b) a pair of valving supply ports communicating with said chamber;
  (c) a pair of valving exhaust ports communicating with said chamber;
  (d) a control pressure outlet port communicating with said chamber;
  (e) a first pair of valve members cooperative with said pair of supply ports, one of said first pair of valve members being disposed interior of said chamber and the other being disposed exterior of said chamber;
  (f) a second pair of valve members cooperative with said pair of exhaust ports, one of said second pair of valve members being disposed interior of said chamber and the other being disposed exterior of said chamber;
  (g) first and second levers pivotally mounted in said chamber;
  (h) a bias spring interconnecting one pair of adjacent ends of said levers;
  (i) a first pair of rigid valve stems connecting said first pair of valve members to said first lever on opposite sides of the pivotal mounting thereof, such that pressure-differential forces experienced by each of said first pair of valve members exert mutually canceling moments upon said first lever, the valve stem on the same side of the pivotal mounting as said bias spring serving to connect to said first lever the one of said first pair of valve members disposed exterior of said chamber;
  (j) a second pair of rigid valve stems connecting said second pair of valve members to said second lever on opposite sides of the pivotal mounting thereof such that pressure-differential forces experienced by each of said second pair of valve members exert mutually canceling moments upon said second lever, the valve stem on the same side of the pivotal mounting as said bias spring serving to connect to said second lever the one of said second pair of valve members disposed exterior of said chamber; and (k) an operating rod slidably engaged by said housing and provided with a pair of lugs arranged thereon in spaced opposing relationship to abut each against one of said first and second levers in opposing directions so that only said first lever is rotated by movement of said operating rod in a first longitudinal direction and only said second lever is rotated by movement of said operating rod in the opposite longitudinal direction.

2. A control valve comprising:
 (a) a housing defining a pressure chamber;
 (b) a pair of valving supply ports communicating with said chamber;
 (c) a pair of valving exhaust ports communicating with said chamber;
 (d) a control pressure outlet port communicating with said chamber;
 (e) a first pair of valve members cooperative with said pair of supply ports;
 (f) a second pair of valve members cooperative with said pair of exhaust ports.
 (g) first lever means mounted for pivotal movement and connected to said first pair of valve members such that pressure-differential forces experienced by said first pair of valve members exert mutually cancelling moments upon said first lever means and such that pivotal movement of said first lever means in one direction tends to open said supply ports and pivotal movement of said first lever means in the opposite direction tends to close said supply ports;
 (h) second lever means mounted for pivotal movement and connected to said second pair of valve members such that pressure-differential forces experienced by said second pair of valve members exert mutually cancelling moments upon said second lever means and such that pivotal movement of said second lever means in one direction tends to open said exhaust ports and pivotal movement of said second lever means in the opposite direction tends to close said exhaust ports;
 (i) operating means mounted for movement in first or second opposing directions;
 (j) means for transmitting at least a portion of the movement of said operating means in said first direction to said first lever means so as to cause said first lever means to move in said direction tending to open said supply ports;
 (k) means for transmitting at least a portion of the movement of said operating means in said second direction to said second lever means so as to cause said second lever means to move in said direction tending to open said exhaust ports; and
 (l) means biasing said first and second lever means to maintain said supply ports normally closed in the absence of movement of said operating means causing opening of said supply ports and to maintain said exhaust ports normally closed in the absence of movement of said operating means causing opening of said exhaust ports.

3. A control valve comprising:
 (a) a housing defining a pressure chamber;
 (b) supply valving means associated with said chamber;
 (c) exhaust valving means associated with said chamber;
 (d) a control pressure outlet port communicating with said chamber;
 (e) first mechanical means mounted for pivotal movement and connected to said supply valving means such that pressure-differential forces experienced by said supply valving means exert mutually cancelling moments upon said first mechanical means and such that pivotal movement of said first mechanical means in one direction tends to open said supply valving means and pivotal movement of said first mechanical means in the opposite direction tends to close said supply valving means;
 (f) second mechanical means mounted for pivotal movement and connected to said exhaust valving means such that pressure-differential forces experienced by said exhaust valving means exert mutually cancelling moments upon said second mechanical means and such that pivotal movement of said second mechanical means in one direction tends to open said exhaust valving means and pivotal movement of said second mechanical means in the opposite direction tends to close said exhaust valving means;
 (g) operating means mounted for movement in first or second opposing directions;
 (h) means for transmitting at least a portion of the movement of said operating means in said first direction to said first mechanical means so as to cause said first mechanical means to move in said direction tending to open said supply valving means;
 (i) means for transmitting at least a portion of the movement of said operating means in said second direction to said second mechanical means so as to cause said second mechanical means to move in said direction tending to close said exhaust valving means; and
 (j) means biasing said first and second mechanical means to maintain said supply valving means normally closed in the absence of movement of said operating means causing opening of said supply valving means and to maintain said exhaust valving means normally closed in the absence of movement of said operating means causing opening of said exhaust valving means.

4. A control valve as claimed in claim 3 wherein said supply valving means comprises:
 (a) a pair of valving supplying ports communicating with said chamber; and
 (b) a first pair of valve members cooperative with said pair of supply ports, one of said valve members being disposed interior of said chamber and the other being disposed exterior of said chamber.

5. A control valve as claimed in claim 3 wherein said exhaust valving means comprises:
 (a) a pair of valving exhaust ports communicating with said chamber; and
 (b) a second pair of valve members cooperative with said pair of exhaust ports, one of said valve members being disposed interior of said chamber and the other being disposed exterior of said chamber.

6. A control valve as defined in claim 3 wherein said means for biasing said first and second mechanical means comprises a bias spring interconnecting said first and second mechanical means.

7. A control valve as claimed in claim 3 wherein said operating means comprises an operating rod slidably mounted and provided with a pair of lugs arranged thereon in spaced opposing relationship to abut each against one of said first and second levers in opposing directions.

8. A control valve comprising:
 (a) a housing defining a pressure chamber;
 (b) a pair of valving supply ports communicating with said chamber;
 (c) a pair of valving exhaust ports communicating with said chamber;
 (d) a control pressure outlet port communicating with said chamber;
 (e) a first pair of valve members cooperative with said pair of supply ports, one of said first pair of valve members being disposed interior of said pressure chamber and the other being disposed exterior of said pressure chamber;
 (f) a second pair of valve members cooperative with said pair of exhaust ports, one of said second pair of valve members being disposed interior of said chamber and the other being disposed exterior of said chamber;
(g) first and second pivotally mounted levers;
(h) a first pair of rigid valve stems connecting said first pair of valve members to said first lever such that pressure-differential forces experienced by each of said first pair of rigid valve stems exert mutually cancelling moments upon said first lever and such that rotation of said first lever in one direction about its pivotal mounting tends to open said supply ports and rotation of said lever about its pivotal mounting in the opposite direction tends to close said supply ports;
(i) a second pair of rigid valve stems connecting said second pair of valve members to said second lever such that pressure-differential forces experienced by each of said first pair of rigid valve stems exert mutually cancelling moments upon said second lever and such that rotation of said first lever about its pivotal mounting in one direction tends to open said exhaust ports and rotation of said second lever about its pivotal mounting in the opposite direction tends to close said exhaust ports;
(j) spring means biasing said first lever in the rotational direction tending to close said supply ports and biasing said second lever in the rotational direction tending to close said exhaust ports;
(k) operating means mounted for movement in first or second opposing directions;
(l) means for transmitting at least a portion of the movement of said operating means in said first direction to said first pivotally mounted lever so as to rotate said first lever in said rotational direction tending to open said supply ports;
(m) means for transmitting at least a portion of the movement of said operating means in said second direction to said second pivotally mounted lever so as to rotate in said direction tending to close said supply ports.

References Cited by the Examiner
UNITED STATES PATENTS

| | | | |
|---|---|---|---|
| 341,827 | 5/1886 | Benham | 137—601 |
| 624,790 | 5/1899 | Gordon | 137—601 |
| 1,836,184 | 12/1931 | Nixon | 137—596.2 |
| 1,916,384 | 7/1933 | Newberg | 137—596 |

MARTIN P. SCHWADRON, *Primary Examiner.*

M. CARY NELSON, *Examiner.*